US007169519B2

(12) United States Patent
Lee et al.

(10) Patent No.: US 7,169,519 B2
(45) Date of Patent: Jan. 30, 2007

(54) DOUBLE-LAYERED POSITIVELY-CHARGED ORGANIC PHOTORECEPTOR

(75) Inventors: Nam-jeong Lee, Gyeonggi-do (KR); Saburo Yokota, Gyeonggi-do (KR); Kyung-yol Yon, Gyeonggi-do (KR); Hwan-koo Lee, Gyeonggi-do (KR); Hae-ree Joo, Seoul (KR); Beom-jun Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 108 days.

(21) Appl. No.: 10/682,480

(22) Filed: Oct. 10, 2003

(65) Prior Publication Data

US 2004/0081902 A1 Apr. 29, 2004

(30) Foreign Application Priority Data

Oct. 28, 2002 (KR) ...................... 10-2002-0065842

(51) Int. Cl.
*B32B 27/18* (2006.01)
*G03G 15/02* (2006.01)

(52) U.S. Cl. .............................. 430/58.05; 430/58.35; 430/58.45; 430/58.6; 428/411.1; 399/116; 399/159

(58) Field of Classification Search ................ 399/116, 399/159; 430/58.05, 58.35, 58.45, 58.6; 428/411.1
See application file for complete search history.

(56) References Cited

U.S. PATENT DOCUMENTS 3,619,050 A * 11/1971 Swanke ...................... 399/161
4,287,279 A 9/1981 Brown et al.
5,013,623 A * 5/1991 Itoh et al. .................. 430/58.5

(Continued)

FOREIGN PATENT DOCUMENTS

CN 1168491 12/1997

(Continued)

OTHER PUBLICATIONS

English translation of Japanese Office Action dated Apr. 26, 2005, corresponds to Japanese Patent Application No. 2003-366543 (a copy of the Japanese Office Action in Japancese was filed on Jul. 26, 2005).

Chinese Office Action for corresponding to Chinese Patent Application No. 2003101247709 dated Jul. 7, 2006.

*Primary Examiner*—Ramsey Zacharia
(74) *Attorney, Agent, or Firm*—Staas & Halsey LLP

(57) ABSTRACT

A double-layered positively-charged organic photoreceptor t does not suffer from contamination caused by charge transport compounds that dissolve out during coating of a charge generating layer, and in which the charge generating layer and a charge transport layer have suitable interfacial properties for effective charge transfer. The composition that forms a charge transport layer on an electroconductive support contains a first charge transport compound that is soluble in an acetate solvent, a second charge transport compound that is insoluble in an acetate solvent, a binder resin, and an organic solvent. The method of manufacturing the photoreceptor includes: coating a surface of an electroconductive support with the charge transport layer forming composition and drying the surface to form a charge transport layer; and coating a surface of the charge transport layer with a charge generating layer forming composition and drying the surface to form a charge generating layer.

8 Claims, 1 Drawing Sheet

U.S. PATENT DOCUMENTS 5,045,421 A * 9/1991 Fuse et al. ................. 430/58.4
6,066,426 A * 5/2000 Mott et al. ................. 430/58.2

FOREIGN PATENT DOCUMENTS

| | | |
|---|---|---|
| CN | 1335538 | 2/2002 |
| JP | 60-237453 | 11/1985 |
| JP | 62-116943 | 5/1987 |
| JP | 08-101517 | 4/1996 |
| JP | 08-211636 | 8/1996 |
| JP | 2000-206713 | 7/2000 |
| JP | 2001-033992 | 2/2001 |
| JP | 2001-175011 | 6/2001 |
| WO | 00-22483 | 4/2000 |

* cited by examiner

DOUBLE-LAYERED POSITIVELY-CHARGED ORGANIC PHOTORECEPTOR

CROSS-REFERENCE TO RELATED APPLICATIONS

This application claims priority from Korean Patent Application No. 2002-65842, filed on Oct. 28, 2002, in the Korean Intellectual Property Office, the disclosure of which is incorporated herein in its entirety by reference.

BACKGROUND OF THE INVENTION

1. Field of the Invention

The present invention relates to an electrophotographic organic photoreceptor, and more particularly, to a double-layered positively-charged organic photoreceptor.

2. Description of the Related Art

Double-layered positively-charged electrophotographic organic photoreceptors basically include a charge transport layer formed on an electroconductive support and a charge generating layer formed on the charge transport layer. An overcoat layer may be optionally formed on the charge generating layer, which has a small thickness, to protect it from wearing by attrition with toner or a cleaning blade. In addition, an adhesive layer for enhancing the adhesion between the electroconductive support and the charge transport layer or a charge blocking layer for blocking charge migration between the two layers may be formed.

An electrophotographic imaging process using such a double-layered positively-charged organic photoreceptor is described as follows. After positively charging the surface of an organic photoreceptor, a laser beam irradiates a charge generating layer to generate positive and negative charges. The positive charges are injected into a charge transport layer by an electric field applied to the organic photoreceptor and migrate to an electroconductive support. The negative charges migrate to the surface of the charge generating layer or an overcoat layer to neutralize surface charges. A surface potential varies by exposure, so that a latent image is formed in an exposed region. Then, this latent image is developed with toner and transferred to a receptor medium, such as paper.

Compared with single-layered organic photoreceptors requiring complex electrical properties for a single layer, double-layered positively-charged organic photoreceptors including two layers responsible for different functions may more easily control electrical properties, such as charge potential and exposure potential. Since a stable electric field may be applied to the thin layers, the charge generating layer and the charge transport layer, of a double-layered positively-charged organic photoreceptor, the photoreceptor may retain a larger amount of charge at a given field strength and develop images with a larger amount of toner. The double-layered positively-charged organic photoreceptor is compatible with wet toner as well as dry toner.

However, when a charge generating layer forming composition is applied to a charge transport layer in the manufacture of a double-layered positively-charged organic photoreceptor, the charge transport layer dissolves in an organic solvent contained in the charge generating layer forming composition, so that materials flow out of the charge transport layer and the charge transport layer becomes uneven. The uneven charge transport layer leads to a lower, fluctuating charge potential or to ineffective charge retention of the organic photoreceptor. In addition, the materials that flow out of the charge transport layer contaminate the charge generating layer forming composition.

To resolve these problems, using an organic solvent incapable of dissolving the materials composing a charge transport layer for a charge generating layer forming composition has been suggested.

However, in a double-layered positively-charged organic photoreceptor manufactured using the suggested method, the solid interface between the charge transport layer and the charge generating layer hinders charges generated in the charge generating layer by laser irradiation to enter the charge transport layer. As a result, a surface potential in the irradiated portion cannot drop sufficiently, and an exposure potential increases with repeated electrophotographic processes.

SUMMARY OF THE INVENTION

An embodiment of the present invention provides a double-layered positively-charged electrophotographic organic photoreceptor with a charge generating layer and a charge transport layer that have effective interfacial properties for charge transfer.

An embodiment of the present invention also provides a charge transport layer forming composition that does not cause the problem of a charge generating layer being contaminated during a coating process and which forms an effective interface between the charge generating layer and the charge transport layer.

Also, an embodiment of the present invention also provides a method of manufacturing a double-layered positively-charged electrophotographic organic photoreceptor with a charge generating layer and a charge transport layer that have effective interfacial properties for charge transfer and in which the charge generating layer is no longer contaminated by charge transport compounds that dissolve out during a coating process.

A double-layered positively-charged electrophotographic organic photoreceptor according to an embodiment of the present invention comprises: an electroconductive support; a charge transport layer formed on the electroconductive support, which contains a first charge transport compound that is soluble in an acetate solvent, and a second charge transport compound that is insoluble in an acetate solvent; and a charge generating layer formed on the charge transport layer.

A charge transport layer forming composition according to an embodiment of the present invention comprises a first charge transport compound that is soluble in an acetate solvent, a second charge transport compound that is insoluble in an acetate solvent, a binder resin, and an organic solvent.

Additional aspects and/or advantages of the invention will be set forth in part in the description which follows and, in part, will be obvious from the description, or may be learned by practice of the invention.

A method of manufacturing a double-layered positively-charged electrophotographic organic photoreceptor according to an embodiment of the present invention comprises: coating a surface of an electroconductive support with the above-described charge transport layer forming composition, and then drying to form a charge transport layer; and coating the charge transport layer with a charge generating layer forming composition, which contains a charge generating compound, a binder, an alcoholic solvent, and an acetate solvent, and then drying to form a charge generating layer.

The above and/or other features and advantages of the present invention will become more apparent by describing in detail exemplary embodiments thereof.

The double-layered positively-charged electrophotographic organic photoreceptor may be implemented in an electrophotographic cartridge, an electrophotographic drum and/or an image forming apparatus.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
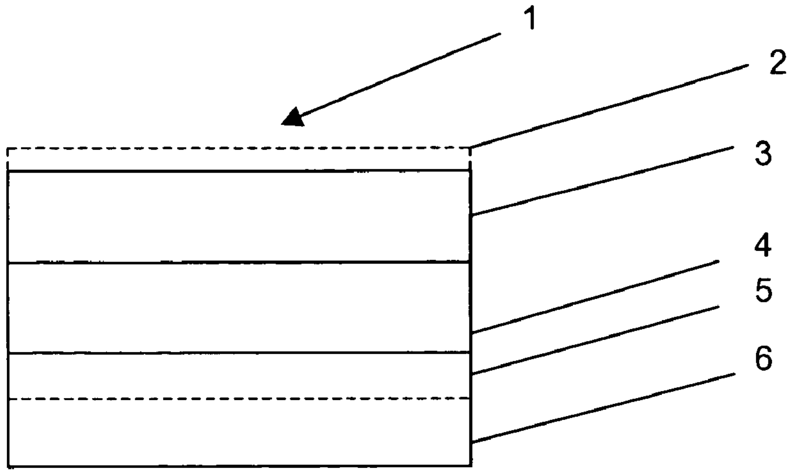
FIG. 1 is a block diagram (not to scale) illustrating a double-layered positively-charged electrophotographic organic photoreceptor comprising at least a charge generating layer and a charge transport layer that have effective interfacial properties for charge transfer in accordance with an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A charge transport layer forming composition according to the present invention will now be described. A charge transport layer forming composition according to the present invention includes a first charge transport compound that is soluble in an acetate solvent, a second charge transport compound that is insoluble in an acetate solvent, a binder resin, and an organic solvent.

The first charge transport compound, which is soluble in an acetate solvent, may be, for example, at least one of charge transport stilbene compounds of formula (1) below. Charge transport stilbene compounds of formula (1) below are disclosed in U.S. Pat. No. 5,013,623.

formula (1)

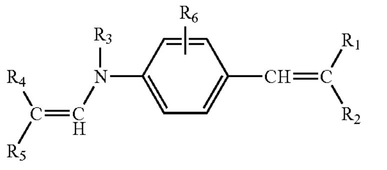

where $R_1$ and $R_2$ are independently selected from the group consisting of a hydrogen atom, a substituted or unsubstituted alkyl group, a substituted or unsubstituted aryl group, and a substituted or unsubstituted styryl, in which at least one of $R_1$ and $R_2$ is a substituted or unsubstituted aryl group or a substituted or unsubstituted styryl; $R_3$ is selected from the group consisting of a substituted or unsubstituted alkyl group, a substituted or unsubstituted aralkyl, and a substituted or unsubstituted aryl group; $R_4$ and $R_5$ are independently selected from the group consisting of a hydrogen atom, a substituted or unsubstituted alkyl group, a substituted or unsubstituted benzyl group, and a substituted or unsubstituted phenyl group; and $R_6$ is selected from the group consisting of a hydrogen atom, a substituted or unsubstituted alkyl group, a substituted or unsubstituted alkoxy group, and a halogen atom.

The second charge transport compound, which is insoluble in an acetate solvent, may be, for example, at least one of the charge transport hydrazone compounds of formula (2) below. Charge transport hydrazone compounds of formula (2) below are disclosed in U.S. Pat. No. 6,066,426:

formula (2)

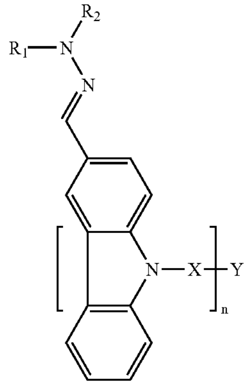

where n is an integer from 2 to 6; $R_1$ and $R_2$ are independently selected from among an alkyl group, a cycloalkyl group, and an aryl group and optionally combine with the nitrogen atom to form a ring; Y is selected from among a bond, a carbon atom, a $-CR_3$ group where $R_3$ is a hydrogen atom, an alkyl group, or an aryl group, an aryl group, a cycloalkyl group, and a cyclosiloxyl group; X is a linking group of the formula of $-(CH_2)_m-$, where m is an integer from 4 to 10, and at least one methylene group is optionally substituted with an oxygen atom, a carbonyl group, or an ester group.

It is preferable that the total amount of the first and second charge transport compounds is in a range of 40–60% by weight of the total solid content of the charge transport layer. The terms "solid content" means the amount of materials composing an organic photoreceptor that do not vaporize and remains after drying.

If a ratio of a first charge transport compound amount to a second charge transport compound amount is too small, the interface between the charge generating layer and the charge transport layer is too solid for charges to enter the charge transport layer. If the ratio is too high, an excess of the first charge transport compound may dissolve in the acetate solvent in a charge generating layer forming composition. Taking the above into account, the amount of the first charge transport compound, with respect to the total amount of the first and second charge transport compounds, in the charge transport layer composition according to the present inventions may be in a range of 30–90% by weight.

Any resin which is an insulator and may form a coating under ordinary conditions or by curing (cross-linking) when exposed to heat or light (namely, thermocurable and photocurable resins) may be used for the binder of the charge transport layer forming composition according to the present invention without limitations. Examples of usable resins include silicone resins, polyamide resins, polyurethane resins, polyester resins, epoxy resins, polyketone resins, polycarbonate resins, polycarbonate copolymers, polyestercarbonate resins, polyformal resins, poly(2,6-dimethylphenyleneoxide), polyvinylbutyral resins, polyvinylacetal resins, styrene-acrylic copolymers, polyacrylic resins, polystyrene resins, melamine resins, stylene-butadiene copolymers, polymethylmethacrylate resins, polyvinylchlorides, ethylene-vinyl acetate copolymers, vinylchloride-vinylacetate copolymers, polyacrylamide resins, polyvinylcarbazoles, polyvinylpyrazolines, polyvinylpyrenes, polyester copolymers, and the like, which may be used individually or in a combination of two or more.

In the charge transport layer composition according to the present invention, if the amount of the binder is too small, it may be impossible to set the form of a charge transport layer, and the charge transport compounds may dissolve out of the charge transport layer when a charge generating layer composition is applied thereto. If the amount of the binder is too large, the amount of the charge transport compounds is relatively lowered, and the mobility of charges may deteriorate. Taking the above into account, the amount of the binder may be in a range of 40–60% by weight.

Examples of the organic solvent usable in the charge transport layer forming composition according to an embodiment of the present invention include aromatic solvents, such as toluene, xylene, and anisole; ketone solvents, such as cyclohexanone and methylcyclohexanone; hydrocarbon halide solvents, such as methylene chloride and tetrachlorocarbon; and ether solvents, such as tetrahydrofuran, 1,3-dioxolane, and 1,4-dioxane. The above-listed solvents may be used individually or in a combination of two or more.

If the amount of the organic solvent in the charge transport layer forming composition according to an embodiment of the present invention is too small, it is difficult to obtain a stable coating composition in which the charge transport compound and the binder are fully dissolved. If the amount of the organic solvent is too large, the coating composition may be too thin to form a charge transport layer having a desired thickness. Taking the above into account, the amount of the organic solvent may be, for example, in a range of 70–80% by weight.

Additives, such as a platicizer, a fluidizing agent, an anti-pinhole agent, an antioxidant, a UV absorber, and the like, may be further added into the charge transport layer forming composition according to an embodiment of the present invention, if necessary.

Examples of usable plasticizers include biphenyl, 3,3',4,4'-tetramethyl-1,1-biphenyl, 3,3",4,4"-tetramethyl-p-terphenyl, 3,3',4,4'-tetramethyl-m-terphenyl, paraffin halide, dimethylnaphthalene, and dibutyl phthalate.

Examples of usable fluidizing agents include Modaflow (a trademark of MONSANTO CHEMICAL CO.) and Acronal 4F (a trademark of BASF CO.)

Examples of usable anti-pinhole agents include benzoine and dimethyl phthalate.

Examples of usable anti-oxidants and usable UV absorbers include 2,6-di-t-butyl-4-methylphenol, 2,4-bis(n-octylthio)-6-(4-hydroxy-3,5-di-t-butylanilino)-1,3,5-triazine, 1,3,5-trimethyl-2,4,6-tris(3,5-di-t-butyl-4-hydroxybenzyl) benzene, 2-(5-t-butyl-2-hydroxyphenyl)benzotriazole, 2--2H-benzotriazole, and the like.

Such additives may be used individually or in a combination of two or more. The amount of additives may be substantially less than or equal to 5 parts by weight with respect to 100 parts by weight of the charge transport compound.

A method of manufacturing a double-layered positively-charged electrophotographic organic photoreceptor according to an embodiment of the present invention includes: coating a surface of an electroconductive support with the above-described charge transport layer forming composition and then drying to form a charge transport layer; and coating the surface of the charge transport layer with a charge generating layer forming composition which contains a charge generating compound, a binder, an alcoholic solvent, and an acetate solvent, and drying to form a charge generating layer.

Examples of electroconductive supports which may be used for the method include metal plates, such as aluminum, aluminum alloys, steel, iron, or copper; metal compound plates, such as tin oxide, indium oxide, and chromium oxide; supports comprising a non-conductive plate bearing a conductive layer, for example, a plastic plate coated with conductive particles, such as carbon black or silver particles, fixed by a binder; and a plastic, paper or a glass plate which is coated with such conductive particles by deposition or sputtering. These supports may have, for example, a cylindrical or sheet-like form, but are not particularly limited in form, size and surface roughness.

Any coating method, for example, such as a ring coating method, a dip coating method, or a spray coating method, may be applied to coat the surface of the electroconductive support with the charge transport layer forming composition. In general, drying is carried out at a temperature of 80–140° C. for 5–90 minutes. A resulting charge transport layer has a thickness of approximately 5–20 μm.

Next, a charge generating layer is formed on the charge transport layer. A charge generating layer forming composition, which is used in the method of manufacturing a doublelayered positively-charged electrophotographic organic photoreceptor according to an embodiment of the present invention, contains a charge generating compound, a binder, an alcoholic solvent, and an acetate solvent.

Examples of an alcoholic solvent that may be used in the charge generating layer forming composition include ethanol, isopropyl alcohol, n-butanol, methanol, 1-methoxy-2-propanol, diacetone alcohol, isobutyl alcohol, and t-butyl alcohol. The alcoholic solvent in the charge generating layer forming composition may be at least one of the foregoing alcoholic solvents.

Examples of an acetate solvent that may be used in the charge generating layer forming composition include ethyl acetate, butyl acetate, isopropyl acetate, isobutyl acetate, and sec-butyl acetate. The acetate solvent that may be used in the charge generating layer forming composition may be at least one of the foregoing acetate solvents.

If the total amount of the alcoholic solvent and the acetate solvent in the charge generating layer forming composition is too small, a resulting charge generating layer is thick, dark decay increases, and the electrophotographic properties of the photoreceptor deteriorate. If the total amount of the alcoholic solvent and the acetate solvent is too large, a resulting charge generating layer is too thin, a small amount of charge is generated by laser irradiation, and an exposure potential in a laser irradiated domain is likely to increase. In addition, if a ratio of an alcoholic solvent amount to an acetate solvent amount is too small, it is impossible to coat the charge transport layer with the charge generating layer forming composition because the materials composing the charge transport layer dissolve out. If the ratio of the alcoholic solvent amount to the acetate solvent amount is too large, the interface between the charge transport layer and the charge generating layer is too solid for charges to enter the charge transport layer, and an exposure potential is likely to increase.

Taking the above into account, the amount of the acetate solvent may be in a range of 10–50% by weight based on the total amount of the alcoholic solvent and the acetate solvent in the charge generating layer forming composition. The total amount of the alcoholic solvent and the acetate solvent may be in a range of 90–99% by weight of the charge generating layer forming composition.

The charge generating compound used in the charge generating layer forming composition is a material capable of absorbing light to generate charge carriers, such as a dye or pigment. Examples of suitable compounds include metal-free phthalocyanines, such as Progen 1 x-form metal-free phthalocyanine (available from ZENECA, INC. ), and metal phthalocyanines, such as titanium phthalocyanine, copper phthalocyanine, titanyloxy phthalocyanine, and hydroxygallium phthalocyanine.

Examples of the binder used in the charge generating layer forming composition include polyvinylbutyrals, polycarbonates, polyvinyl alcohols, polystyrene-Co-butadienes, modified acrylic polymers, polyvinylacetates, stylene-alkyd resins, polyvinylchlorides, polyvinylidene chlorides, polyacrylonitriles, polyacrylic acids, polyacrylates, polymethacrylates, styrene polymers, alkyd resins, polyamides, polyurethanes, polyesters, polysulfones, polyesters, and combinations of the foregoing materials.

In the charge generating layer forming composition, if the amount of the charge generating compound is too small or too large, the ability to generate charges is ineffective. If the amount of the binder is too small, the adhesion of the charge generating layer to the charge transport layer is ineffective. If the amount of the binder is too large, the amount of the charge generating compound is relatively small and the ability of the charge generating layer to generate charges deteriorates. Taking the above into account, the amount of the charge generating compound may be in a range of 55–85% by weight based on the total solid content of the charge generating layer forming composition. The amount of the binder may be in a range of 15–45% by weight based on the total solid content of the charge generating layer forming composition.

The charge generating layer forming composition may further include additives, such as a platicizer, a fluidizing agent, an anti-pinhole agent, an anti-oxidant, a UV absorber, and the like, if necessary.

Examples of usable plasticizers include biphenyl, 3,3',4,4'-tetramethyl-1,1-biphenyl, 3,3",4,4"-tetramethyl-p-terphenyl, 3,3',4,4'-tetramethyl-m-terphenyl, paraffin halide, dimethyinaphthalene, and dibutyl phthalate.

Examples of usable fluidizing agents include Modaflow (a trademark of MONSANTO CHEMICAL CO.) and Acronal 4F (a trademark of BASF CO.)

Examples of usable anti-pinhole agents include benzoine and dimethyl phthalate.

Examples of usable anti-oxidants and usable UV absorbers include 2,6-di-t-butyl-4-methylphenol, 2,4-bis(n-octylthio)-6-(4-hydroxy-3,5-di-t-butylanilino)-1,3,5-triazine, 1,3,5-trimethyl-2,4,6-tris(3,5-di-t-butyl-4-hydroxybenzyl) benzene, 2-(5-t-butyl-2-hydroxyphenyl)benzotriazole, 2--2H-benzotriazole, and the like.

Such additives may be used individually or in a combination of two or more. The amount of additives may be substantially less than or equal to 5 parts by weight with respect to 100 parts by weight of the charge generating compound.

Any coating method, for example, such as a ring coating method, a dip coating method, or a spray coating method, may be applied to coat the surface of the charge transport layer with the charge generating layer forming composition. In general, drying is carried out at a temperature of 80–140° C. for 5–90 minutes. A resulting charge generating layer typically has a thickness of approximately 0.2–1.0 μm.

The method of manufacturing a double-layered positively-charged electrophotographic organic photoreceptor according to the present invention may further include forming a charge blocking layer, an overcoat layer, and other additional layers. The charge blocking layer enhances the adhesion between the electroconductive support and the charge transport layer and blocks charge injection from the electroconductive support. The overcoat layer is formed as a protective layer on the charge generating layer. Suitable materials for the overcoat layer include, but are not limited to, polyaminoethers, polyurethanes, and silsesquioxanes.

The present invention also provides a double-layered positively-charged electrophotographic organic photoreceptor comprising: an electroconductive support; a charge transport layer formed on the electroconductive support and containing a first charge transport compound that is soluble in an acetate solvent, a second charge transport compound that is insoluble in an acetate solvent, and a binder resin; and a charge generating layer formed on the charge transport layer.

The organic photoreceptor according to an embodiment of the present invention may be effectively manufactured using the above-described charge transport layer forming composition according to the above-described method.

As described above, the first charge transport compound, which is soluble in an acetate solvent, may be at least one of charge transport stilbene compounds of formula (1) above. The second charge transport compound, which is insoluble in an acetate solvent, may be at least one of charge transport hydrazone compounds of formula (2) above. The total amount of the first and second charge transport compounds may be in a range of 40–60% by weight of the total solid content of the charge transport layer. The amount of the first charge transport compound, with respect to the total amount of the first and second charge transport compounds, in the charge transport layer composition according to an embodiment of the present invention may be in a range of 30–90% by weight.

Any resin which is an insulator and may form a coating under ordinary conditions or by curing (cross-linking) when exposed to heat or light (namely, thermocurable and photocurable resins) may be used for the binder of the charge transport layer forming composition according to an embodiment of the present invention without limitations. Examples of usable resins include silicone resins, polyamide resins, polyurethane resins, polyester resins, epoxy resins, polyketone resins, polycarbonate resins, polycarbonate copolymers, polyestercarbonate resins, polyformal resins, poly(2,6-dimethylphenyleneoxide), polyvinylbutyral resins, polyvinylacetal resins, styrene-acrylic copolymers, polyacrylic resins, polystyrene resins, melamine resins, styrene-butadiene copolymers, polymethylmethacrylate resins, polyvinylchlorides, ethylene-vinyl acetate copolymers, vinylchloride-vinylacetate copolymers, polyacrylamide resins, polyvinylcarbazoles, polyvinylpyrazolines, polyvinylpyrenes, polyester copolymers, and the like, which may be used individually or in a combination of two or more.

The amount of the binder in the charge transport layer may be in a range of 40–60% by weight.

Optionally, the double-layered positively-charged electrophotographic organic photoreceptor may further include an overcoat layer on the charge generating layer and an adhesive layer between the charge transport layer and the electroconductive support. The overcoat layer formed on the charge generating layer is for protecting the charge generating layer having a small thickness from wearing by attrition with toner or a cleaning blade. The adhesive layer between the charge transport layer and the electroconductive support is for enhancing the adhesion between the two layers and for blocking charge migration between the two layers. The overcoat layer may be made of, for example, polyaminoethers, polyurethanes, or silsesquioxanes, without limitation to these compounds.

In the double-layered positively-charged electrophotographic organic photoreceptor according to an embodiment of the present invention, the charge generating layer and the charge transport layer have suitable interfacial properties for effective charge transfer from the charge generating layer to the charge transport layer. Accordingly, the organic photoreceptor is compatible with both electrophotographic imaging processes utilizing dry toner and wet toner. When applied to a wet electrophotographic imaging process, the organic photoreceptor advantageously requires low image fixing energy and provides high-resolution image output.

Selected embodiments of present invention will be described in greater detail with reference to the following examples. The following examples are for illustrative purposes and are not intended to limit the scope of the invention.

EXAMPLE 1

A charge transport stilbene compound of formula (3) below was obtained according to the method disclosed in U.S. Pat. No. 5,013,623, and used as a first charge transport compound.

formula (3):

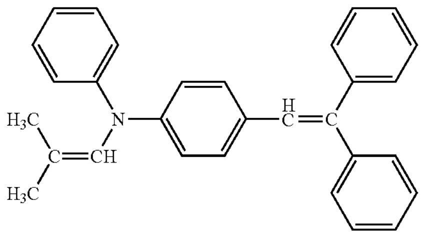

A charge transport hydrazone compound of formula (4) below was obtained according to the method disclosed in U.S. Pat. No. 6,066,426, and was used as a second charge transport compound.

formula (4):

-continued

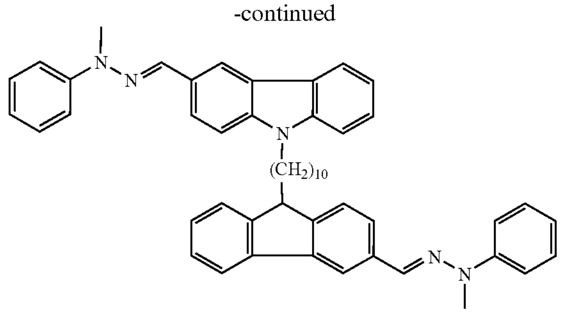

0.575 g of the first charge transport compound, 0.575 g of the second charge transport compound, and 1.15 g of polycarbonate (PCZ200, available from MITSUBISHI CHEMICAL, Japan) as a binder were dissolved in 7.7 g of tetrahydrofuran (THF). This solution was filtered through a syringe filter having an average pore size of 1 μm to provide a charge transport layer forming composition.

The charge transport layer forming composition was coated on the surface of an aluminum drum using a ring coating apparatus at a rate of 300 mm/min to form a charge transport layer having a thickness of about 8 μm.

A solution of 0.84 g of polyvinylbutyral (BX-1, available from SEKISUI CO., Japan) in 17.2 g of ethanol was mixed with 1.96 g of titanyloxy phthalocyanine (TiOPc, available from H.W. SANDS) as a charge generating compound. This mixture was milled in an attritor for 1 hour. 2.92 g of the resulting milled dispersion was diluted with 2.88 g of butylacetate and 4.2 g of ethanol and filtered through a syringe filter having an average pore size of 5 μm to provide a charge generating layer forming composition.

This charge generating layer forming composition was coated on the charge transport layer at a rate of 250 mm/min to form a charge generating layer having a thickness of about 0.3 μm. As a result, a double-layered positively-charged organic photoreceptor was obtained.

EXAMPLE 2

A double-layered positively-charged organic photoreceptor was manufactured in the same manner as in Example 1, except that 0.345 g of the first charge transport compound, 0.805 g of the second charge transport compound, and 1.15 g of polycarbonate (PCZ200, available from MITSUBISHI CHEMICAL, Japan) as a binder, which were the same as in Example 1, were dissolved in 7.7 g of THF to provide the charge transport layer forming composition.

COMPARATIVE EXAMPLE 1

A double-layered positively-charged organic photoreceptor was manufactured in the same manner as in Example 1, except that only 1.15 g of the first charge transport material and 1.15 g of polycarbonate (PCZ200, available from MITSUBISHI CHEMICAL, Japan) as a binder, which were the same as in Example 1, were dissolved in 7.7 g of THF, without the second charge transport compound, to provide the charge transport layer forming composition.

COMPARATIVE EXAMPLE 2

A double-layered positively-charged organic photoreceptor was manufactured in the same manner as in Example 1, except that only 1.15 g of the second charge transport material and 1.15 g of polycarbonate (PCZ200, available from MITSUBISHI CHEMICAL, Japan) as a binder, which were the same as in Example 1, were dissolved in 7.7 g of THF, without the first charge transport compound, to provide the charge transport layer forming composition.

COMPARATIVE EXAMPLE 3

A solution of 0.84 g of polyvinylbutyral (BX-1, available from SEKISUI CO., Japan) in 17.2 g of ethanol was mixed with 1.96 g of titanyloxy phthalocyanine (TiOPc, available from H.W. SANDS) as a charge generating compound. This mixture was milled in an attritor for 1 hour. 2.92 g of the resulting milled dispersion was diluted with 6.72 g of butylacetate and 0.36 g of ethanol and filtered through a syringe filter having an average pore size of 5 μm to provide a charge generating layer forming composition.

A double-layered positively-charged organic photoreceptor was manufactured in the same manner as in Example 1, except that the charge generating layer forming composition prepared above and the charge transport layer forming composition prepared in Comparative Example 1 were used.

COMPARATIVE EXAMPLE 4

A double-layered positively-charged organic photoreceptor was manufactured in the same manner as in Example 1, except that the charge transport layer forming composition prepared in Comparative Example 2 and the charge generating layer forming composition prepared in Comparative Example 3 were used.

The significant compositional difference between the organic photoreceptors manufactured in Examples 1 and 2 and Comparative Examples 1 through 4 appears in Table 1.

TABLE 1

| | Weight ratio of first charge transport compound amount to second charge transport compound amount in charge transport layer forming composition | Weight ratio of acetate solvent amount to alcoholic solvent amount in charge generating layer composition |
|---|---|---|
| Example 1 | 5:5 | 3:7 |
| Example 2 | 3:7 | 3:7 |
| Comparative Example 1 | 1:0 | 3:7 |
| Comparative Example 2 | 0:1 | 3:7 |

Evaluation

The electrical properties, i.e., the charge potential and the exposure potential, of each of the organic photoreceptors manufactured in Examples 1 and 2 and Comparative Examples 1 through 4 were measured using a drum photoreceptor evaluation apparatus (PDT 2000 from QEA). A corona voltage +8.0 kV was applied to the photoreceptors charged with a relative speed of a charger and the photoreceptor being 100 mm/sec, immediately followed by irradiating monochrome light having a wavelength of 780 nm at a constant exposure energy of 1 μJ/$cm^2$. The results are shown in Table 2.

TABLE 2

| Evaluation Item | Example 1 | Example 2 | Comparative Example 1 | Comparative Example 2 | Comparative Example 3 | Comparative Example 4 |
|---|---|---|---|---|---|---|
| Charge potential (V) | 464 | 451 | 412 | 467 | 456 | 449 |
| Exposure potential (V) | 69 | 78 | 37 | 96 | 55 | 81 |

As shown in Table 2, for the organic photoreceptors of Comparative Examples 1, 2, and 4, the charge potential is relatively low while the exposure potential is relatively high, indicating that they have ineffective electrical properties. The organic photoreceptor of Comparative Example 3 has effective electrical properties, but has a rough surface because an excess of the first charge transport compound has dissolved out during manufacturing.

The organic photoreceptors of Examples 1 and 2 according to an embodiment of the present invention have effective electrical properties: high charge potential and low exposure potential. In addition, the organic photoreceptors have smooth surfaces because the charge transport compounds are effectively blocked from dissolving out of the charge transport layer, when in contact with a composition that forms a charge generating layer.

In a double-layered positively-charged electrophotographic organic photoreceptor according to an embodiment of the present invention, which is manufactured using the above-described charge transport layer forming composition according to an embodiment of the above method, the charge generating layer no longer suffers from contamination caused by charge transport compounds that dissolve out when charge transport layers are coated with compositions that form a charge generating layer. In addition, the charge generating layer and the charge transport layer have suitable interfacial properties for effective charge transfer from the charge generating layer to the charge transport layer. The organic photoreceptor according to an embodiment of the present invention has effective electrical properties and is compatible with wet toner as well as dry toner.

FIG. 1 is a block diagram (not to scale) illustrating a double-layered positively-charged electrophotographic organic photoreceptor 1 comprising at least a charge generating layer 3 and a charge transport layer 4 that have effective interfacial properties for charge transfer. In the embodiment illustrated, the charge transporting layer 4 may be installed on an electroconductive support 6, and the charge generating layer 3 may be formed on the charge transport layer 4. Further, where desired, an adhesive layer or a charge blocking layer 5 may be located between the electroconductive support 6 and the charge transport layer 4. In addition, where desired, an overcoat layer 2 may be formed on the charge generating layer 3. Also, Further description of the overcoat layer 2 and the adhesive layer or charge blocking layer 5 is recited above. Where desired, the electroconductive support 6 may comprise a drum.

Figure 2:
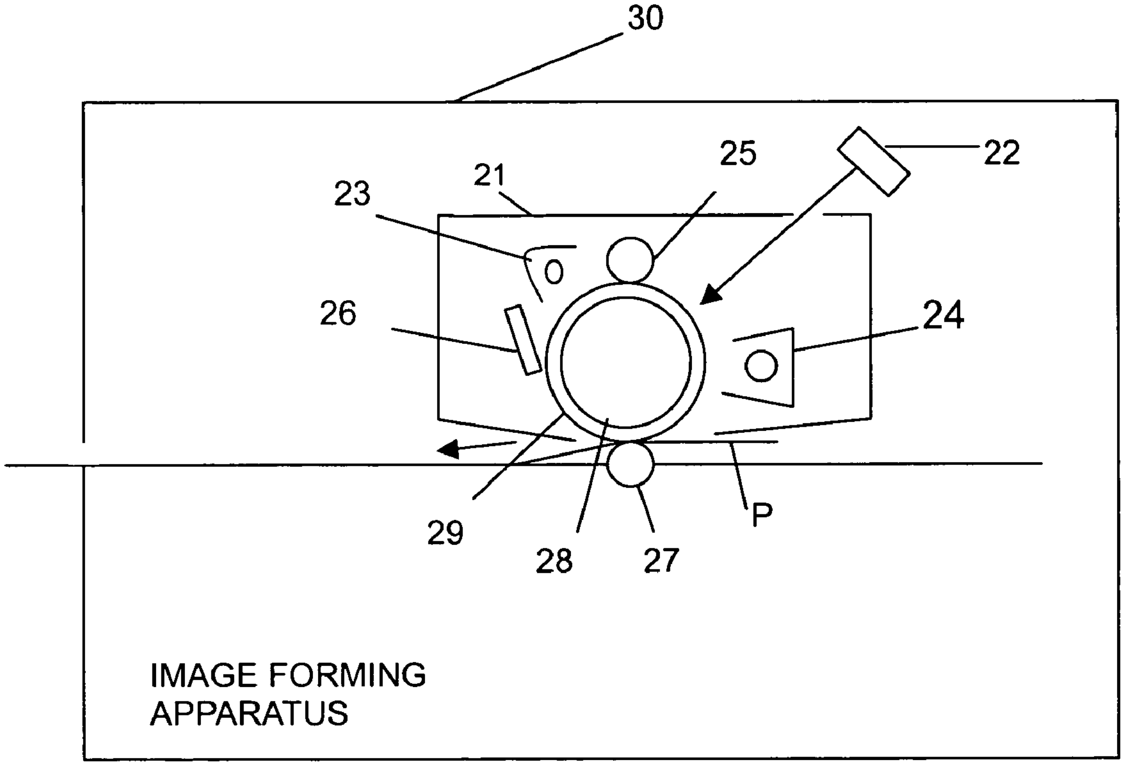
FIG. 2 is a schematic representation of an image forming apparatus, an electrophotographic drum, and an electrophotographic cartridge in accordance with selected embodiments of the present invention.

FIG. 2 is a schematic representation of an image forming apparatus 30, an electrophotographic drum 28, and an electrophotographic cartridge 21 in accordance with selected embodiments of the present invention. The electrophotographic cartridge 21 typically comprises a double-layered positively-charged electrophotographic organic photoreceptor 29 and at least one of a charging device 25 that charges the electrophotographic organic photoreceptor 29, a developing device 24 which develops an electrostatic latent image formed on the electrophotographic organic photoreceptor 29, and a cleaning device 26 which cleans a surface of the electrophotographic organic photoreceptor 29. The electrophotographic cartridge 21 may be attached to or detached from the image forming apparatus 30, and the electrophotographic organic photoreceptor 29 is described more fully above.

The electrophotographic organic photoreceptor drum 28, 29 for an image forming apparatus 30, generally includes a drum 28 that is attachable to and detachable from the electrophotographic apparatus 30 and that includes the electrophotographic organic photoreceptor 29 disposed on the drum 28, wherein the electrophotographic organic photoreceptor 29 is described more fully above.

Generally, the image forming apparatus 30 includes a photoreceptor unit (e.g., a drum 28 having an electrophotographic organic photoreceptor 29 situated thereon), a charging device 25 which charges the photoreceptor unit, an imagewise light irradiating device 22 which irradiates the charged photoreceptor unit with imagewise light to form an electrostatic latent image on the photoreceptor unit, a developing unit 24 that develops the electrostatic latent image with a toner to form a toner image on the photoreceptor unit, and a transfer device 27 which transfers the toner image onto a receiving material, such as paper P, wherein the photoreceptor unit comprises an electrophotographic organic photoreceptor 29 as described in greater detail above. The charging device 25 may be supplied with a voltage as a charging unit and may contact and charge the electrophotographic organic photoreceptor. Where desired, the apparatus may include a pre-exposure unit 23 to erase residual charge on the surface of the electrophotographic organic photoreceptor 29 to prepare for a next cycle.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A double-layered positively-charged organic photoreceptor comprising:

an electroconductive support;

a charge transport layer formed on the electroconductive support, comprising:

a first charge transport compound that is soluble in an acetate solvent;

a second charge transport compound that is insoluble in an acetate solvent; and a binder resin; and a charge generating layer formed on the charge transport layer, wherein the first charge transport compound is at least one selected from charge transport compounds of formula (1) below:

formula (1):

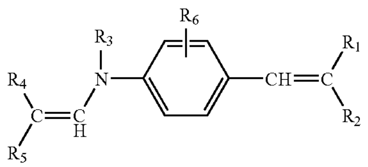

where R1 and R2 are independently selected from the group consisting of a hydrogen atom, a substituted or unsubstituted alkyl group, a substituted or unsubstituted aryl group, and a substituted or unsubstituted styryl, in which at least one of R1 and R2 is a substituted or unsubstituted aryl group or a substituted or unsubstituted styryl; R3 is selected from the group consisting of a substituted or unsubstituted alkyl group, a substituted or unsubstituted aralkyl, and a substituted or unsubstituted aryl group; R4 and R5 are independently selected from the group consisting of a hydrogen atom, a substituted or unsubstituted alkyl group, a substituted or unsubstituted benzyl group, and a substituted or unsubstituted phenyl group; and R6 is selected from the group consisting of a hydrogen atom, a substituted or unsubstituted alkyl group, a substituted or unsubstituted alkoxy group, and a halogen atom, and wherein the second charge transport compound is at least one of charge transport compounds of formula (2) below:

formula (2):

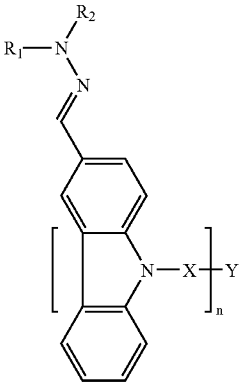

where n is an integer from 2 to 6; R1 and R2 are independently selected from among an alkyl group, a cycloalkyl group, and an aryl group and optionally combine with the nitrogen atom to form a ring; Y is selected from among a bond, a carbon atom, a —CR3 group where R3 is a hydrogen atom, an alkyl group, or an aryl group, an aryl group, a cycloalkyl group, and a cyclosiloxyl group; X is a linking group of the formula of —(CH2)m-, where m is an integer from 4 to 10, and at least one methylene group is optionally substituted with an oxygen atom, a carbonyl group, or an ester group, wherein an amount of the first charge transport compound is in a range of 30–90% by weight based on a total weight of the first and the second charge transport compounds.

2. The double-layered positively-charged organic photoreceptor of claim 1, wherein a total amount of the first and the second charge transport compounds is in a range of 40–60% by weight based on a weight of the charge transport layer.

3. The double-layered positively-charged organic photoreceptor of claim 1, further comprising an overcoat layer on the charge generating layer.

4. An electrophotographic cartridge, comprising:

a double-layered positively-charged organic photoreceptor, comprising:

an electroconductive support;

a charge transport layer formed on the electroconductive support, comprising:

a first charge transport compound that is soluble in an acetate solvent;

a second charge transport compound that is insoluble in an acetate solvent; and a binder resin; and a charge generating layer formed on the charge transport layer, wherein the charge transport layer and the charge generating layer have effective interfacial properties for charge transfer; and at least one of:

a charging device that charges the electrophotographic organic photoreceptor;

a developing device which develops an electrostatic latent image formed on the electrophotographic organic photoreceptor; and a cleaning device which cleans a surface of the electrophotographic organic photoreceptor, wherein the electrophotographic cartridge is attachable to/detachable from an image forming apparatus, wherein the first charge transport compound is at least one selected from charge transport compounds of formula (1) below:

formula (1):

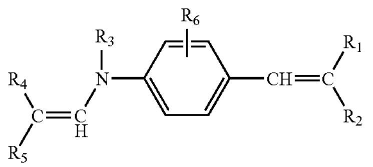

where R1 and R2 are independently selected from the group consisting of a hydrogen atom, a substituted or unsubstituted alkyl group, a substituted or unsubstituted aryl group, and a substituted or unsubstituted styryl, in which at least one of R1 and R2 is a substituted or unsubstituted aryl group or a substituted or unsubstituted styryl; R3 is selected from the group consisting of a substituted or unsubstituted alkyl group, a substituted or unsubstituted aralkyl, and a substituted or unsubstituted aryl group; R4 and R5 are independently selected from the group consisting of a hydrogen atom, a substituted or unsubstituted alkyl group, a substituted or unsubstituted benzyl group, and a substituted or unsubstituted phenyl group; and R6 is selected from the group consisting of a hydrogen atom, a substituted or unsubstituted alkyl group, a substituted or unsubstituted alkoxy group, and a halogen atom, and wherein the second charge transport compound is at least one of charge transport compounds of formula (2) below:

formula (2):

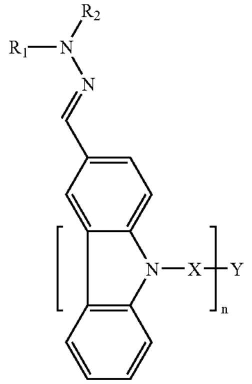

where n is an integer from 2 to 6; R1 and R2 are independently selected from among an alkyl group, a cycloalkyl group, and an aryl group and optionally combine with the nitrogen atom. to form a ring; Y is selected from among a bond, a carbon atom, a —CR3 group where R3 is a hydrogen atom, an alkyl group, or an aryl group, an aryl group, a cycloalkyl group, and a cyclosiloxyl group; X is a linking group of the formula of —(CH2)m-, where m is an integer from 4 to 10, and at least one methylene group is optionally substituted with an oxygen atom, a carbonyl group, or an ester group, wherein an amount of the first charge transport compound is in a range of 30–90% by weight based on a total weight of the first and the second charge transport compounds.

5. An electrophotographic drum, comprising:

a drum that is attachable to and detachable from an electrophotographic apparatus; and a double-layered positively-charged organic photoreceptor disposed on the drum, the double-layered positively-charged organic photoreceptor comprising:

an electroconductive support;

a charge transport layer formed on the electroconductive support, comprising:

a first charge transport compound that is soluble in an acetate solvent, wherein the first charge transport compound is at least one selected from charge transport compounds of formula (1) below:

formula (1):

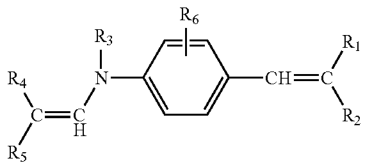

where R1 and R2 are independently selected from the group consisting of a hydrogen atom, a substituted or unsubstituted alkyl group, a substituted or unsubstituted aryl group, and a substituted or unsubstituted styryl, in which at least one of R1 and R2 is a substituted or unsubstituted aryl group or a substituted or unsubstituted styryl; R3 is selected from the group consisting of a substituted or unsubstituted alkyl group, a substituted or unsubstituted aralkyl, and a substituted or unsubstituted aryl group; R4 and R5 are independently selected from the group consisting of a hydrogen atom, a substituted or unsubstituted alkyl group, a substituted or unsubstituted benzyl group, and a substituted or unsubstituted phenyl group; and R6 is selected from the group consisting of a hydrogen atom, a substituted or unsubstituted alkyl group, a substituted or unsubstituted alkoxy group, and a halogen atom.;

a second charge transport compound that is insoluble in an acetate solvent; and a binder resin; and a charge generating layer formed on the charge transport layer, wherein the charge generating layer and the charge transport layer have effective interfacial properties for charge transfer, and wherein the second charge transport compound is at least one of charge transport compounds of formula (2) below:

formula (2):

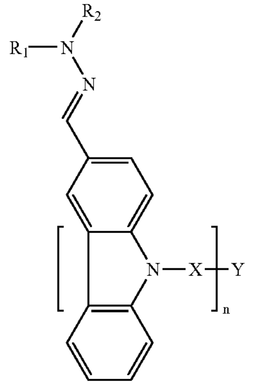

where n is an integer from 2 to 6; R1 and R2 are independently selected from among an alkyl group, a cycloalkyl group, and an aryl group and optionally combine with the nitrogen atom to form a ring; Y is selected from among a bond, a carbon atom, a —CR3 group where R3 is a hydrogen atom, an alkyl group, or an aryl group, an aryl group, a cycloalkyl group, and a cyclosiloxyl group; X is a linking group of the formula of —(CH2)m-, where m is an integer from 4 to 10, and at least one methylene group is optionally substituted with an oxygen atom, a carbonyl group, or an ester group, wherein an amount of the first charge transport compound is in a range of 30–90% by weight based on a total weight of the first and the second charge transport compounds.

6. An image forming apparatus comprising:

a photoreceptor unit comprising:

a double-layered positively-charged organic photoreceptor disposed on the drum, the double-layered positively-charged organic photoreceptor comprising:

an electroconductive support;

a charge transport layer formed on the electroconductive support, comprising:

a first charge transport compound that is soluble in an acetate solvent;

a second charge transport compound that is insoluble in an acetate solvent; and a binder resin; and a charge generating layer formed on the charge transport layer, wherein the charge generating layer and the charge transport layer have effective interfacial properties for charge transfer;

a charging device which charges the photoreceptor unit;

an imagewise light irradiating device which irradiates the charged photoreceptor unit with imagewise light to form an electrostatic latent image on the photoreceptor unit;

a developing unit that develops the electrostatic latent image with a toner to form a toner image on the photoreceptor unit; and a transfer device which transfers the toner image onto a receiving material, wherein the first charge transport compound is at least one selected from charge transport compounds of formula (1) below:

formula (1):

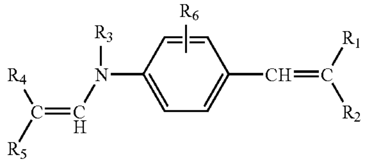

where R1 and R2 are independently selected from the group consisting of a hydrogen atom, a substituted or unsubstituted alkyl group, a substituted or unsubstituted aryl group, and a substituted or unsubstituted styryl, in which at least one of R1 and R2 is a substituted or unsubstituted aryl group or a substituted or unsubstituted styryl; R3 is selected from the group consisting of a substituted or unsubstituted alkyl group, a substituted or unsubstituted aralkyl, and a substituted or unsubstituted aryl group; R4 and R5 are independently selected from the group consisting of a hydrogen atom, a substituted or unsubstituted alkyl group, a substituted or unsubstituted benzyl group, and a substituted or unsubstituted phenyl group; and R6 is selected from the group consisting of a hydrogen atom, a substituted or unsubstituted alkyl group, a substituted or unsubstituted alkoxy group, and a halogen atom, and wherein the second charge transport compound is at least one of charge transport compounds of formula (2) below:

formula (2):

-continued

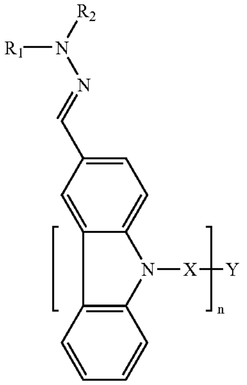

where n is an integer from 2 to 6; R1 and R2 are independently selected from among an alkyl group, a cycloalkyl group, and an aryl group and optionally combine with the nitrogen atom to form a ring; Y is selected from among a bond, a carbon atom, a —CR3 group where R3 is a hydrogen atom, an alkyl group, or an aryl group, an aryl group, a cycloalkyl group, and a cyclosiloxyl group; X is a linking group of the formula of —(CH2)m-, where m is an integer from 4 to 10, and at least one methylene group is optionally substituted with an oxygen atom, a carbonyl group, or an ester group, wherein an amount of the first charge transport compound is in a range of 30–90% by weight based on a total weight of the first and the second charge transport compounds.

7. A double-layered positively-charged organic photoreceptor comprising:

an electroconductive support;

a charge transport layer formed on the electroconductive support, comprising:

a first charge transport compound that is soluble in an acetate solvent;

a second charge transport compound that is insoluble in an acetate solvent; and a binder resin; and a charge generating layer formed on the charge transport layer, wherein the first charge transport compound comprises a compound represented by formula (3):

formula (3):

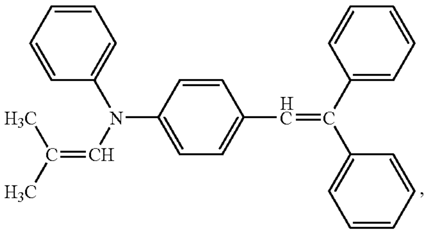

, and wherein the second charge transport compound is at least one of charge transport compounds of formula (2) below:

formula (2):

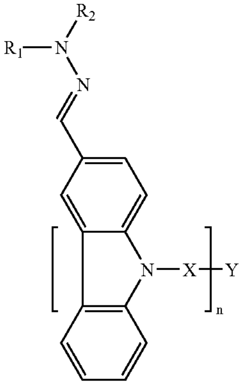

where n is an integer from 2 to 6; R1 and R2 are independently selected from among an alkyl group, a cycloalkyl group, and an aryl group and optionally combine with the nitrogen atom to form a ring; Y is selected from among a bond, a carbon atom, a —CR3 group where R3 is a hydrogen atom, an alkyl group, or an aryl group, an aryl group, a cycloalkyl group, and a cyclosiloxyl group; X is a linking group of the formula of —(CH2)m-, where m is an integer from 4 to 10, and at least one methylene group is optionally substituted with an oxygen atom, a carbonyl group, or an ester group, wherein an amount of the first charge transport compound is in a range of 30–90% by weight based on a total weight of the first and the second charge transport compounds.

8. A double-layered positively-charged organic photoreceptor comprising:

an electroconductive support;

a charge transport layer formed on the electroconductive support, comprising:

a first charge transport compound that is soluble in an acetate solvent;

a second charge transport compound that is insoluble in an acetate solvent; and a binder resin; and a charge generating layer formed on the charge transport layer, wherein the second charge transport compound comprises a compound represented by formula (4):

formula (4):

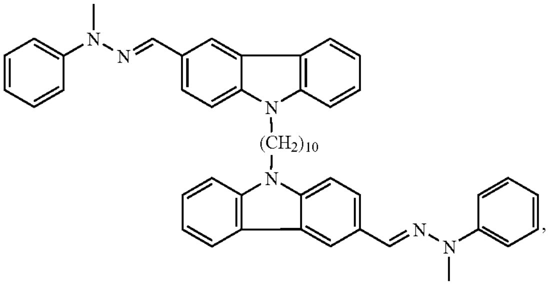

, and wherein the first charge transport compound is at least one selected from charge transport compounds of formula (1) below:

formula (1):

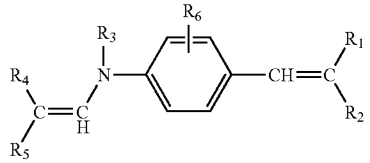

where R1 and R2 are independently selected from the group consisting of a hydrogen atom, a substituted or unsubstituted alkyl group, a substituted or unsubstituted aryl group, and a substituted or unsubstituted styryl, in which at least one of R1 and R2 is a substituted or unsubstituted aryl group or a substituted or unsubstituted styryl; R3 is selected from the group consisting of a substituted or unsubstituted alkyl group, a substituted or unsubstituted aralkyl, and a substituted or unsubstituted aryl group; R4 and R5 are independently selected from the group consisting of a hydrogen atom, a substituted or unsubstituted alkyl group, a substituted or unsubstituted benzyl group, and a substituted or unsubstituted phenyl group; and R6 is selected from the group consisting of a hydrogen atom, a substituted or unsubstituted alkyl group, a substituted or unsubstituted alkoxy group, and a halogen atoms, wherein an amount of the first charge transport compound is in a range of 30–90% by weight based on a total weight of the first and the second charge transport compounds.

* * * * *

UNITED STATES PATENT AND TRADEMARK OFFICE

CERTIFICATE OF CORRECTION

PATENT NO. : 7,169,519 B2

APPLICATION NO. : 10/682480

DATED : January 30, 2007

INVENTOR(S) : Nam-jeong Lee et al.

It is certified that error appears in the above-identified patent and that said Letters Patent is hereby corrected as shown below:

Title Page, Column 2 (Other Publications), Line 3, change “Japancese” to --Japanese--.

Title Page, Column 2 (Abstract), Line 1, after “photoreceptor” delete “t”.

Column 16, Line 29, change “atom.” to --atom--.

Column 17, Line 18, change “atom.;” to --atom;--.

Column 22, Line 13, change “atoms,” to --atom,--.

Signed and Sealed this

Twenty-fourth Day of April, 2007

JON W. DUDAS

*Director of the United States Patent and Trademark Office*